(12) United States Patent
Namba et al.

(10) Patent No.: US 11,522,205 B2
(45) Date of Patent: Dec. 6, 2022

(54) FUEL CELL SYSTEM AND CONTROL METHOD FOR FUEL CELL SYSTEM

(71) Applicant: TOYOTA JIDOSHA KABUSHIKI KAISHA, Toyota (JP)

(72) Inventors: Ryouichi Namba, Okazaki (JP); Toshiyuki Sanada, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 44 days.

(21) Appl. No.: 17/235,342

(22) Filed: Apr. 20, 2021

(65) Prior Publication Data

US 2021/0376348 A1 Dec. 2, 2021

(30) Foreign Application Priority Data

May 29, 2020 (JP) .............................. JP2020-094395

(51) Int. Cl.
*H01M 8/04537* (2016.01)
*H01M 16/00* (2006.01)
*H01M 8/04828* (2016.01)
*H01M 8/04858* (2016.01)

(52) U.S. Cl.
CPC ..... *H01M 8/04626* (2013.01); *H01M 8/0494* (2013.01); *H01M 8/04611* (2013.01); *H01M 8/04947* (2013.01); *H01M 16/006* (2013.01)

(58) Field of Classification Search
CPC ......... H01M 8/04626; H01M 8/04947; H01M 8/04611; H01M 8/04619; H01M 8/04932; H01M 8/0494; H01M 8/04253; H01M 8/04268; H01M 8/04302; H01M 16/00; H01M 16/006

See application file for complete search history.

(56) References Cited

U.S. PATENT DOCUMENTS

| | | | |
|---|---|---|---|
| 2010/0203409 A1* | 8/2010 | Manabe ............ | H01M 8/04037 429/432 |
| 2010/0227240 A1* | 9/2010 | Manabe ............. | H01M 8/0494 429/442 |
| 2011/0293972 A1* | 12/2011 | Naganuma ........ | H01M 8/04007 429/9 |
| 2012/0107706 A1 | 5/2012 | Tanaka et al. | |
| 2016/0380290 A1* | 12/2016 | Okamoto ............ | H01M 16/006 429/9 |

FOREIGN PATENT DOCUMENTS

JP 2008108668 A 5/2008
WO 2010150337 A1 12/2010

* cited by examiner

*Primary Examiner* — Christopher P Domone
(74) *Attorney, Agent, or Firm* — Dickinson Wright, PLLC

(57) ABSTRACT

The control device is provided with a power generation part configured to be able to selectively perform normal power generation and low efficiency power generation in which the power generation loss is greater compared with normal power generation when there is a request for warmup of the fuel cell. The power generation part temporarily stops the low efficiency power generation and performs normal power generation when during performance of the low efficiency power generation the target generated electric power of the fuel cell becomes equal to or greater than a predetermined first switching electric power.

7 Claims, 11 Drawing Sheets

FUEL CELL SYSTEM AND CONTROL METHOD FOR FUEL CELL SYSTEM

FIELD

The present disclosure relates to a fuel cell system and a control method for a fuel cell system.

BACKGROUND

International Publication No. 2010/150337 discloses, as a conventional fuel cell system, one which performs low efficiency power generation, where the power generation loss becomes larger at the time of system startup compared with normal power generation, to thereby perform a rapid warmup operation making the amount of self heat generation of the fuel cell increase and making the fuel cell rapidly warm up.

SUMMARY

At the time of low efficiency power generation, to enlarge the concentration overvoltage and make the power generation loss increase, assuming the same generated electric power, the flow rate of the feed of oxidizing agent gas to be supplied to the fuel cell becomes smaller than the time of normal power generation. That is, the target value of the air stoichiometric ratio set at the time of low efficiency power generation (ratio of flow rate of feed of oxidizing agent gas actually supplied to minimum flow rate of feed of oxidizing gas required for generating target generated electric power) becomes smaller than the target value of the air stoichiometric ratio set at the time of normal power generation. Further, at the time of low efficiency power generation, which is performed in a state where the air stoichiometric ratio is made smaller than the time of normal power generation, when the air stoichiometric ratio deviates from its target value, the extent of fluctuation of the voltage of the fuel cell tends to becomes greater than the time of normal power generation.

Therefore, at the time of transition where the target generated electric power changes, until the flow rate of feed of oxidizing agent gas is controlled to the post-transition target flow rate, the air stoichiometric ratio will deviate from the post-transition target value. Therefore, at the time of low efficiency power generation, during transition, the actual voltage of the fuel cell will tend to greatly deviate from the target voltage. As a result, the actual generated electric power will tend to greatly deviate from the target generated electric power.

If the actual generated electric power becomes greater than the target generated electric power, the excess electric power at that time is charged to the battery. On the other hand, if the actual generated electric power becomes smaller than the target generated electric power, the insufficient amount of electric power at that time is output from the battery. For this reason, if the deviation of the actual generated electric power with respect to the target generated electric power becomes greater, the battery is liable to become an overcharged state or overdischarged state and the battery is liable to deteriorate.

In this way, at the time of low efficiency power generation, at the time of transition, the actual generated electric power tends to greatly deviate from the target generated electric power, so the battery is liable to become an overcharged state or overdischarged state and the battery to deteriorate.

The present disclosure was made focusing on such a problem point and has as its object to keep a battery from becoming an overcharged state or overdischarged state and the battery from deteriorating during a rapid warmup operation where low efficiency power generation is performed.

To solve this technical problem, the fuel cell system according to one aspect of the present disclosure comprises: a fuel cell generating electric power by electrochemical reactions between a fuel gas and oxidizing agent gas; a rechargeable battery charged with excess electric power and discharging an insufficient amount of electric power at the time of power generation of the fuel cell; and a control device. The control device comprises a power generation part configured to be able to selectively perform normal power generation and low efficiency power generation in which the power generation loss is greater compared with normal power generation when there is a request for warmup of the fuel cell. The power generation part is configured to temporarily stop low efficiency power generation and perform normal power generation when during low efficiency power generation the target generated electric power of the fuel cell becomes equal to or greater than a predetermined first switching electric power.

Further, a control method for the fuel cell system according to one aspect of the present disclosure comprise: selectively performing normal power generation and low efficiency power generation in which the power generation loss is greater compared with normal power generation when there is a request for warmup of the fuel cell; and temporarily stopping low efficiency power generation and performing normal power generation when during performance of low efficiency power generation the target generated electric power of the fuel cell becomes equal to or greater than a predetermined first switching electric power.

According to these aspect of the present disclosure, at the time of transition when the target generated electric power is increasing, normal power generation can be performed, so the actual generated electric power can be kept from deviating from the target generated electric power. Therefore, it is possible to keep the battery from becoming an overcharged state or overdischarged state and the battery from deteriorating.

DESCRIPTION OF EMBODIMENTS

Below, an embodiment of the present disclosure will be explained in detail with reference to the drawings. Note that, in the following explanation, similar component elements are assigned the same reference notations.

Figure 1:
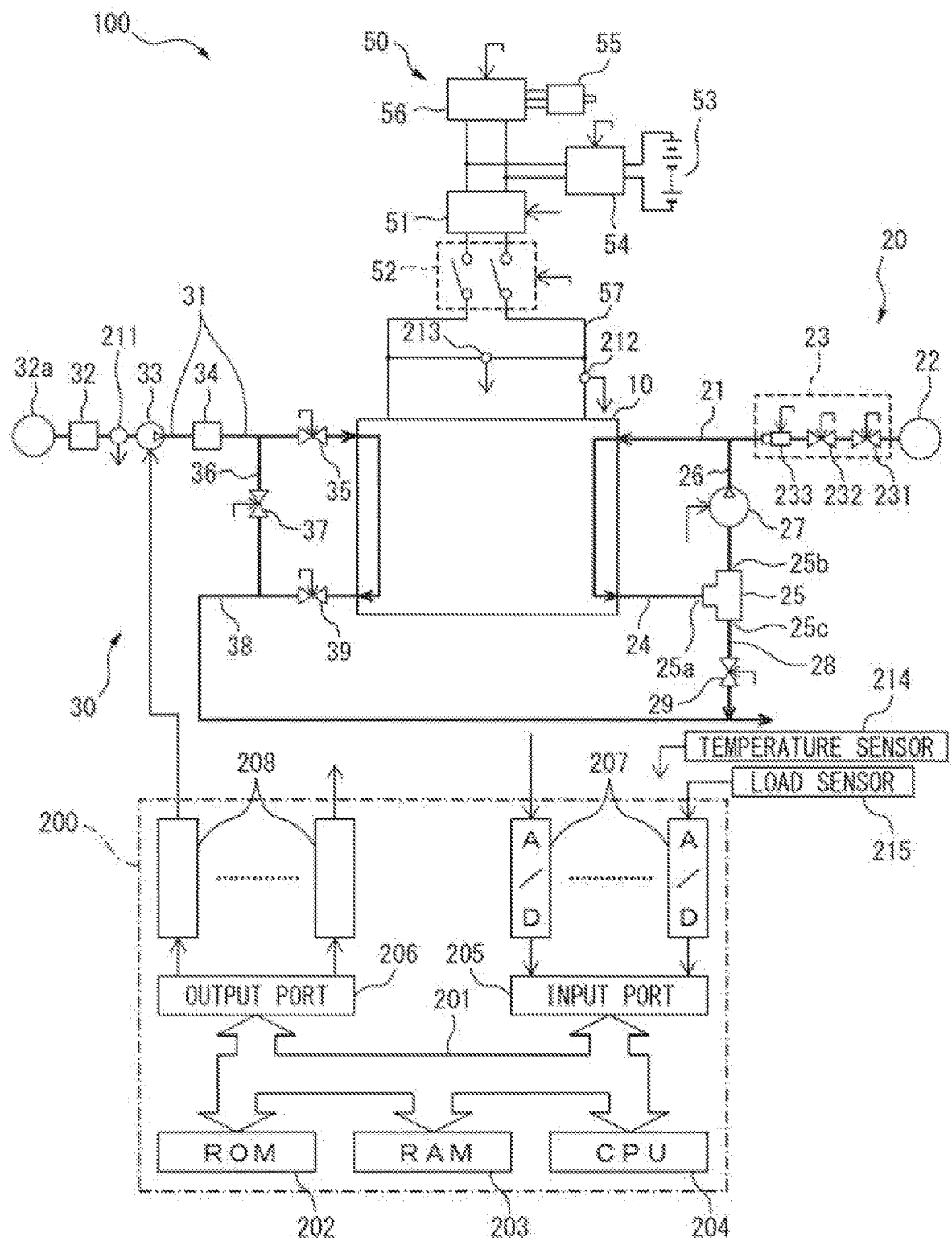
FIG. 1 is a schematic view of the configuration of a fuel cell system according to one embodiment of the present disclosure.

FIG. 1 is a schematic view of the configuration of a fuel cell system 100 according to one embodiment of the present disclosure mounted in a vehicle.

The fuel cell system 100 is provided with a fuel cell stack 10, a hydrogen feed device 20 for supplying hydrogen to the fuel cell stack 10 as an anode gas (fuel gas), an air feed device 30 for supplying air to the fuel cell stack 10 as a cathode gas (oxidizing agent gas), an electrical load part 50 electrically connected to an output terminal of the fuel cell stack 10, and an electronic control unit 200 for overall control of the various control parts of the fuel cell system 100.

The fuel cell stack 10 is comprised of a plurality of fuel cell unit cells (hereinafter referred to as "unit cells") stacked together along the stacking direction with the unit cells electrically connected in series. The unit cells are provided with MFA (membrane electrode assemblies).

Each MEA is comprised of a proton conducting ion exchange membrane formed by a solid polymer material (hereinafter referred to as a "electrolytic membrane") on one surface of which an anode electrode is formed and on the other surface a cathode electrode is formed—all of which are integrally joined. When electric power is being generated at the fuel cell stack 10, the following electrochemical reactions occur at the anode electrode and cathode electrode:

Anode electrode: $2H_2 \rightarrow 4H^+ + 4e^-$ (1)

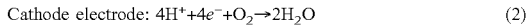

Cathode electrode: $4H^+ + 4e^- + O_2 \rightarrow 2H_2O$ (2)

The anode electrode and the cathode electrode are respectively provided with catalyst layers comprised of porous carbon materials in which a catalyst is supported. The catalyst layers contain platinum as a catalyst for promoting the electrochemical reactions between the hydrogen and oxygen (hydrogen oxidation reaction of formula (1) and oxygen reduction reaction of formula (2)). Note that, the two outer sides of the MEA may also further be provided with an anode gas diffusion layer and a cathode gas diffusion layer.

The hydrogen feed device 20 is provided with a hydrogen feed pipe 21, a high pressure hydrogen tank 22 as a hydrogen source, a hydrogen feed control part 23, an anode off-gas pipe 24, a gas-liquid separator 25, a hydrogen return pipe 26, a hydrogen recirculation pump 27, a purge pipe 28, and a purge control valve 29.

The hydrogen feed pipe 21 is a pipe through which hydrogen supplied to the fuel cell stack 10 flows. One end is connected to the high pressure hydrogen tank 22, while the other end is connected to the fuel cell stack 10.

The high pressure hydrogen tank 22 stores the hydrogen supplied through the hydrogen feed pipe 21 to the fuel cell stack 10 and in turn the anode electrodes of the unit cells.

The hydrogen feed control part 23 is provided with a main check valve 231, a regulator 232, and an injector 233.

The main check valve 231 is a solenoid valve which is opened and closed by the electronic control unit 200 and is provided at the hydrogen feed pipe 21. If the main check valve 231 is opened, hydrogen flows out from the high pressure hydrogen tank 22 to the hydrogen feed pipe 21. If the main check valve 231 is closed, the outflow of hydrogen from the high pressure hydrogen tank 22 is stopped.

The regulator 232 is provided at the hydrogen teed pipe 21 downstream from the main check valve 231. The regulator 232 is a pressure control valve able to be adjusted in opening degree continuously or in steps. Its opening degree is controlled by the electronic control unit 200. By controlling the opening degree of the regulator 232, the pressure of the hydrogen at the downstream side from the regulator 232, that is, the pressure of the hydrogen injected from the injector 233, is controlled.

The injector 233 is provided at the hydrogen feed pipe 21 downstream from the regulator 232. The injector 233 is, for example, a needle valve and is controlled to open and close by the electronic control unit 200. By controlling the opening time period of the injector 233, the flow rate of the hydrogen injected from the injector 233 is controlled.

In this way, using the hydrogen feed control part 23, the feed of hydrogen from the high pressure hydrogen tank 22 to the fuel cell stack 10 is controlled. That is, using the hydrogen feed control part 23, hydrogen controlled to the desired pressure and flow rate is supplied to the fuel cell stack 10.

The anode off-gas pipe 24 is a pipe through which anode off-gas which had flowed out from the fuel cell stack 10 flows. One end is connected to the fuel cell stack 10, while the other end is connected to a gas inflow port 25a of the gas-liquid separator 25. The anode off-gas is gas containing the excess hydrogen which was not used for the electrochemical reactions in each unit cell and the nitrogen and other inert gas and water content (liquid water and steam) which permeated from the cathode side through the MEA to the anode electrode side.

The gas-liquid separator 25 is provided with a gas inflow port 25a, a gas outflow port 25b, and a liquid water outflow port 25c. The gas-liquid separator 25 separates the water in the anode off-gas flowing from the gas inflow port 25a to the inside. Further, the gas-liquid separator 25 discharges the separated water from the liquid water outflow port 25c to a purge pipe 28 and discharges the anode off-gas containing hydrogen from which water was separated from the gas outflow port 25b to a hydrogen return pipe 26.

The hydrogen return pipe 26 is a pipe with one end connected to the gas outflow port 25b of the gas-liquid separator 23 and with the other end connected to the hydrogen feed pipe 21 downstream from the hydrogen feed control part 23. At the hydrogen return pipe 26, the anode off-gas discharged from the gas outflow port 25b of the gas-liquid separator 25 flows.

The hydrogen recirculation pump 27 is provided at the hydrogen return pipe 26. The hydrogen recirculation pump 27 is a pump for recirculating the hydrogen contained in the anode off-gas, that is, the excess hydrogen which was not used for the electrochemical reactions in each cell, by returning it to the hydrogen feed pipe 21. The hydrogen recirculation pump 27 pressurizes the anode off-gas discharged from the gas outflow port 25b of the gas-liquid separator 25 and pumps it to the hydrogen feed pipe 21.

The purge pipe 28 is a pipe with one end connected to the liquid water outflow port 25c of the gas-liquid separator 25 and with the other end connected to a later explained cathode off-gas pipe 38.

The purge control valve 29 is a solenoid valve which is opened and closed by the electronic control unit 200 and is provided at the purge pipe 28. The purge control valve 29 is usually closed and is periodically opened over short time periods. If the purge control valve 29 is opened, the water separated inside the gas-liquid separator 25 is discharged through the purge pipe 28 from the cathode off-gas pipe 38 to the outside.

In this way, the fuel cell system 100 according to the present embodiment is a hydrogen recirculation type of fuel cell system which recirculates the anode off-gas flowing out from the hydrogen passage 2 by returning it to the hydrogen feed pipe 21, but it may also be made a nonhydrogen recirculating type of fuel cell system in which the anode off-gas flowing out from the hydrogen passage 2 is not returned to the hydrogen reed pipe 21.

The air feed device 30 is provided with an air feed pipe 31, air cleaner 32, compressor 33, intercooler 34, cathode inlet valve 35, bypass pipe 36, distribution valve 37, cathode off-gas pipe 38, and cathode pressure control valve 39.

The air feed pipe 31 is a pipe through which air flows for supply to the fuel cell stack 10 and in turn the cathode electrode of each unit cell. One end is connected to the air cleaner 32, while the other end is connected to the fuel cell stack 10.

The air cleaner 32 removes the foreign matter in the air sucked into the air feed pipe 31. The air cleaner 32 is arranged in the atmosphere which serves as the oxygen source 32a. That is, the oxygen source 32a communicates with the air feed pipe 31 through the air cleaner 32.

The compressor 33, for example, is a centrifugal type or axial flow type of turbo compressor and is provided at the air feed pipe 31. The compressor 33 compresses and discharges the air sucked into the air feed pipe 31 through the air cleaner 32. Note that, at the air feed pipe 31 upstream from the compressor 33, a cathode flow rate sensor 211 is provided for detecting the flow rate of air sucked in and discharged by the compressor 33 (below, referred to as the "total air feed quantity") Qacp [NL/min].

The intercooler 34 is provided at the air feed pipe 31 downstream from the compressor 33 and cools the air discharged from the compressor 33 for example by the outside air stream or cooling water etc.

The cathode inlet valve 35 is a valve which is opened and closed by the electronic control unit 200 and is provided at the air feed pipe 31 downstream from the intercooler 34. The cathode inlet valve 35 is opened when it is necessary to supply air to the fuel cell stack 10.

The bypass pipe 36 is a pipe for making part or all of the air discharged from the compressor 33 directly flow into the later explained cathode off-gas pipe 38 without passing through the fuel cell stack 10 in accordance with need. The bypass pipe 36 is connected at one end to the air feed pipe 31 between the intercooler 34 and cathode inlet valve 35 and at the other end to the cathode off-gas pipe 38 downstream from the later explained cathode pressure control valve 39.

The distribution valve 37 is provided in the bypass pipe 36. The distribution valve 37 is a solenoid valve which can be adjusted in opening degree continuously or in steps. Its opening degree is controlled by the electronic control unit 200.

The cathode off-gas pipe 38 is a pipe through which cathode off-gas flowing out from the fuel cell stack 10 flows. One end is connected to the fuel cell stack 10, while the other end is opened to the atmosphere. The cathode off-gas is a gas containing the excess oxygen which was not used for the electrochemical reactions in each unit cell and the nitrogen or other inert gas and water content generated by the electrochemical reactions (liquid water or steam).

The cathode pressure control valve 39 is provided in the cathode off-gas pipe 38. The cathode pressure control valve 39 is a solenoid valve which can be adjusted in opening degree continuously or in steps. Its opening degree is controlled by the electronic control unit 200. By controlling the opening degree of the cathode pressure control valve 39, the pressure inside the fuel cell stack 10, that is, the cathode pressure, is controlled.

By controlling the compressor 33 and in turn the total air feed quantity Qafc and the respective opening degrees of the cathode inlet valve 35, distribution valve 37, and cathode pressure control valve 39, the flow rate Qfc [NL/min] of the air supplied to the fuel cell stack 10 in the air discharged from the compressor 33 (below, referred to as the "FC air feed quantity") is controlled.

The electrical load part 50 is provided with a first converter 51, circuit breaker 52, battery 53, second converter 34, motor-generator 55, and inverter 56.

At the connection line 57 between the electrical load part 50 and the output terminal of the fuel cell stack 10, a current sensor 212 for detecting the current Ifc [A] taken out from the fuel cell stack 10 (below, referred to as the "FC current") and a voltage sensor 213 for detecting the terminal voltage Vfc [V] of the output terminal of the fuel cell stack 10 (below, referred to as the "FC voltage") are provided.

The first converter 51 is a bidirectional DC/DC converter provided with an electrical circuit able to raise and lower the terminal voltage at the primary side terminal. The primary side terminal is connected to the output terminal of the fuel cell stack 10 while the secondary side terminal is connected to the DC side terminal of the inverter 56. The first converter 51 raises and lowers the FC output voltage Vfc becoming the primary side terminal voltage based on a control signal from the electronic control unit 200 and due to this controls the FC current Ifc to the target PC current Itg set according to the operating state of the fuel cell system 100.

The circuit breaker 52 is opened and closed by the electronic control unit 200 and electrically and physically connects or disconnects the fuel cell stack 10 and the electrical load part 50.

The battery 53, for example, is a nickel-cadmium storage battery, a nickel-hydrogen storage battery, a lithium ion battery, or other rechargeable secondary cell. The battery 53 is charged with excess electric power of the fuel cell stack 10 and regenerated electric power of the motor-generator 55. The electric power charged to the battery 53 is in accordance with need used for driving the motor-generator 55, compressor 33, and other various types of control pans which the fuel cell system 100 is provided with.

The second converter 54 is, for example, a bidirectional DC/DC converter provided with an electrical circuit able to raise and lower the terminal voltage of the secondary side terminal. Its primary side terminal is connected to the output terminal of the battery 53 while its secondary side terminal is connected to the DC side terminal of the inverter 56. The second convener 54 makes the input voltage of the inverter 56 becoming the terminal voltage of the secondary side rise and fall based on the control signal from the electronic control unit 200.

The motor-generator 33 is, for example, a three-phase permanent magnet type synchronous motor which is provided with a function as a motor for generating drive power of the vehicle in which the fuel cell system 100 is mounted and a function as a generator generating electric power at the time of deceleration of the vehicle. The motor-generator 55 is connected to the AC side terminal of the inverter 56 and is driven by the generated electric power of the fuel cell stack 10 and the electric power of the battery 53.

The inverter 56 is provided with an electric circuit able to convert DC current input from a DC side terminal to AC current based on a control signal from the electronic control unit 200 and output it from the AC side terminal and conversely able to convert AC current input from an AC side terminal to DC current based on a control signal from the electronic control unit 200 and output it from the DC side terminal. The DC side terminal of the inverter 56 is connected to the secondary side terminals of the first converter 51 and the second converter 34 while the AC side terminal of the inverter 56 is connected to the input and output terminal of the motor-generator 55. When making the motor-generator 55 function as a motor, the inverter 56 converts the DC current from the fuel cell stack 10 and the battery 53 to AC current (in the present embodiment, three-phase AC current) to supply it to the motor-generator 55. On the other hand, when making the motor-generator 55 function as a generator, the inverter 56 converts the AC current from the motor-generator 55 to DC current to supply it to the battery 53 etc.

The electronic control unit 200 is comprised of a digital computer provided with components connected to each other by a bidirectional bus 201 such as a ROM (read only memory)202, RAM (random access memory) 203, CPU (microprocessor)204, input port 205, and output port 206.

At the input port 205, output signals of not only the above-mentioned cathode flow rate sensor 211 or current sensor 212 or voltage sensor 213, but also an FC temperature sensor 214 for detecting the temperature Tfc [° C.] of the fuel cell stack 10 (below, referred to as the "FC temperature"), a load sensor 215 for detecting an amount of depression of an accelerator pedal (below, referred to as the "amount of accelerator depression") etc. are input through corresponding AD converters 207.

At the output port 206, the hydrogen feed control part 23 (main check valve 231, regulator 232, and injector 233) and the hydrogen recirculation pump 27, purge control valve 29, compressor 33, cathode inlet valve 35, distribution valve 37, cathode pressure control valve 39, first converter 51, circuit breaker 52, second converter 54, inverter 56, and other control parts are electrically connected through corresponding drive circuits 208.

The electronic control unit 200 outputs control signals from the output port 206 for controlling the control parts based on the output signals of various sensors input to the input port 205 to control the fuel cell system 100. Below, the control of the fuel cell system 100 which the electronic control unit 200 performs, in particular the control of the FC air feed quantity Qfc during the rapid warmup control at the time of startup of the fuel cell system 100 below the freezing point, will be explained.

Figure 2:
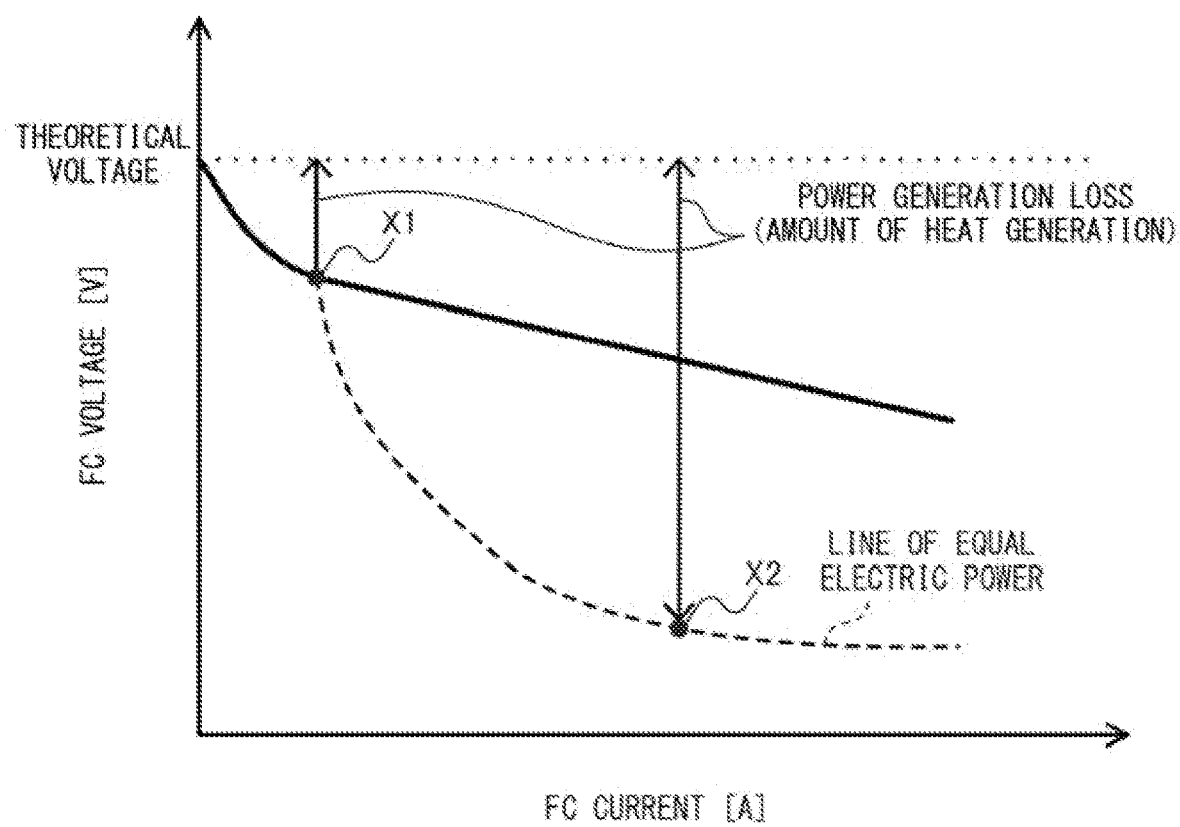
FIG. 2 is a view showing a current-voltage characteristic serving as a standard for a fuel cell stack when an FC temperature is a certain temperature.

FIG. 2 is a view showing a current-voltage characteristic serving as a standard for a fuel cell stack 10 when a stack temperature Tfc is a certain temperature (below, referred to as the "standard IV characteristic"). The standard IV characteristic is the IV characteristic when performing high efficiency power generation suppressing various types of power generation loss occurring at the time of power generation (normal power generation).

The electronic control unit 200 calculates the target generated electric power Ptg [kW] of the fuel cell stack 10 based on the operating state of the fuel cell system 100. In the present embodiment, the electronic control unit 200 calculates the total value of requested electric power of the motor-generator 55 calculated based on the amount of accelerator depression etc. and the requested electric powers of the compressor 33 and other auxiliaries as the target generated electric power Ptg.

Further, as shown in FIG. 2, at the time of normal operation performing high efficiency power generation alter the fuel cell stack 10 finishes warming up, the electronic control unit 200 controls the air stoichiometric ratio and in turn the FC air feed quantity Qfc so that the operating point X defined by the FC current Ifc and FC voltage Vfc becomes a normal operating point X1 able to generate the target generated electric power Ptg on the standard IV characteristic.

The "air stoichiometric ratio" is the ratio of the actual FC air feed quantity Qfc with respect to the minimum FC air feed quantity Qst required for generating the target generated electric power Ptg (below, referred to as the "stoichiometric FC air feed quantity"). Therefore, as the air stoichiometric ratio (=Qfc/Qst) becomes greater than 1.0, the actual FC air feed quantity Qfc becomes greater than the stoichiometric FC air feed quantity Qst.

Figure 3:
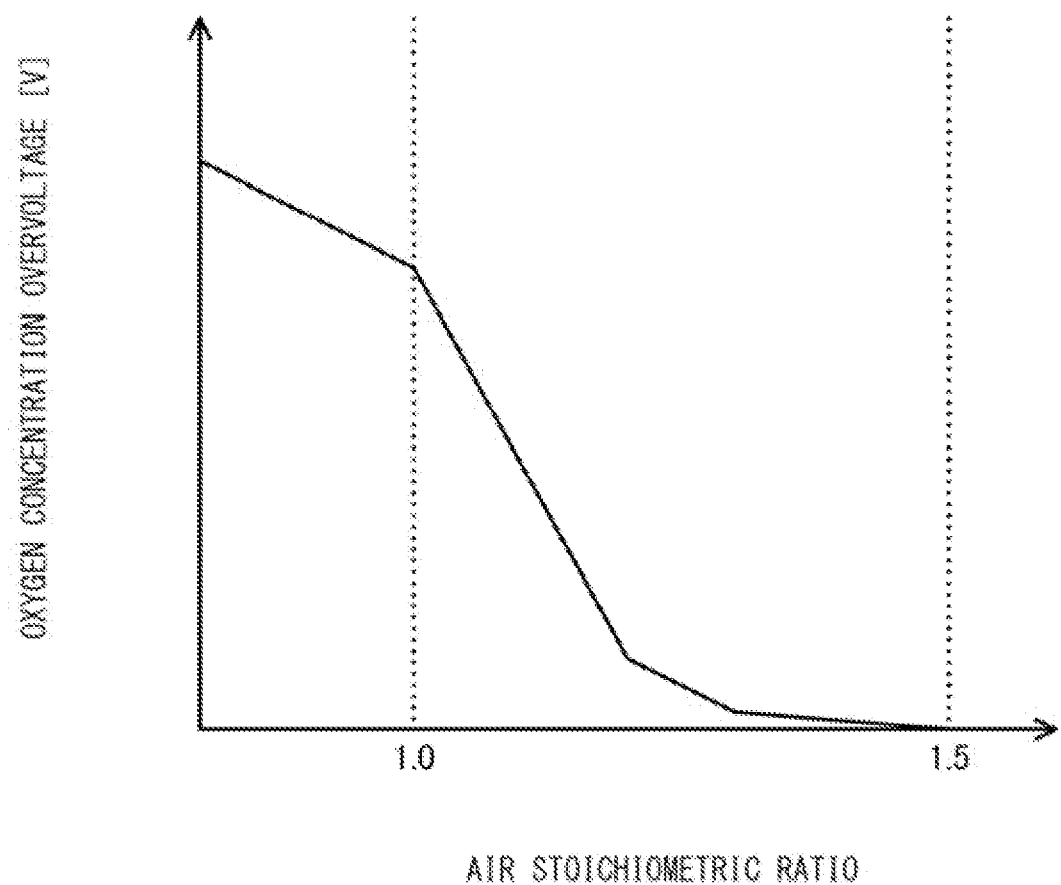
FIG. 3 is a view explaining a relationship of an air stoichiometric ratio and oxygen concentration overvoltage of one factor of power generation loss.

FIG. 3 is a view explaining a relationship of an air stoichiometric ratio and oxygen concentration overvoltage of one factor of power generation loss (power generator loss occurring due to insufficient oxygen at time of power generation).

As shown in FIG. 3, the oxygen concentration overvoltage tends to become larger when the air stoichiometric ratio is small compared to when it is large. In other words, the power generation loss due to the oxygen concentration overvoltage (amount of voltage drop) tends to become larger when the air stoichiometric ratio is small compared to when it is large.

Therefore, at the time of normal operation, the electronic control unit 200 controls the FC air feed quantity Qfc so that the air stoichiometric ratio becomes an air stoichiometric ratio in a normal region where the oxygen concentration overvoltage can be substantially ignored (in the example shown in FIG. 3, for example, an air stoichiometric ratio near 1.5) so as to perform high efficiency power generation kept down in power generation loss.

On the other hand, when starting up and operating a fuel cell system 100 in an environment below the freezing point, the electronic control unit 200 performs a rapid warmup operation so as to keep the water generated along with power generation from freezing while enabling the IV characteristic, which worsens the lower the temperature at the time, to be quickly restored. A rapid warmup operation is a method of operation in which the FC air feed quantity Qfc is controlled to make the oxygen concentration overvoltage increase from the time of normal operation to intentionally make the power generation loss increase and thereby make the amount of self heat generation of the fuel cell stack 10 increase to promote warmup.

At the time of a rapid warmup operation, the electronic control unit 200 controls the FC air feed quantity Qfc so that the air stoichiometric ratio becomes an air stoichiometric ratio in a rapid warmup region where the oxygen concentration overvoltage can no longer be ignored (in the example shown in FIG. 3, for example, an air stoichiometric ratio near 1.0) so as to perform low efficiency power generation generating the target generated electric power Ptg while making the power generation loss (amount of self heat generation) increase over normal operation.

Due to this, compared with the case in FIG. 2 of performing high efficiency power generation (normal power generation) at the normal operating point X1 on the standard IV characteristic, it is possible to make the FC voltage Vfc drop by exactly the amount of the oxygen concentration overvoltage corresponding to the air stoichiometric ratio. That is, by controlling the FC current Ifc while suitably controlling the air stoichiometric ratio and in turn the FC air feed quantity Qfc, as shown in FIG. 2, it is possible to generate electric power at the normal operating point X1 and the rapid warmup operating point X2 making the power generation loss increase from the normal operating point X1 and giving the desired amount of self heat generation on the line of equal power (see broken line), so it is possible to promote warmup of the fuel cell stack 10.

Figure 4:
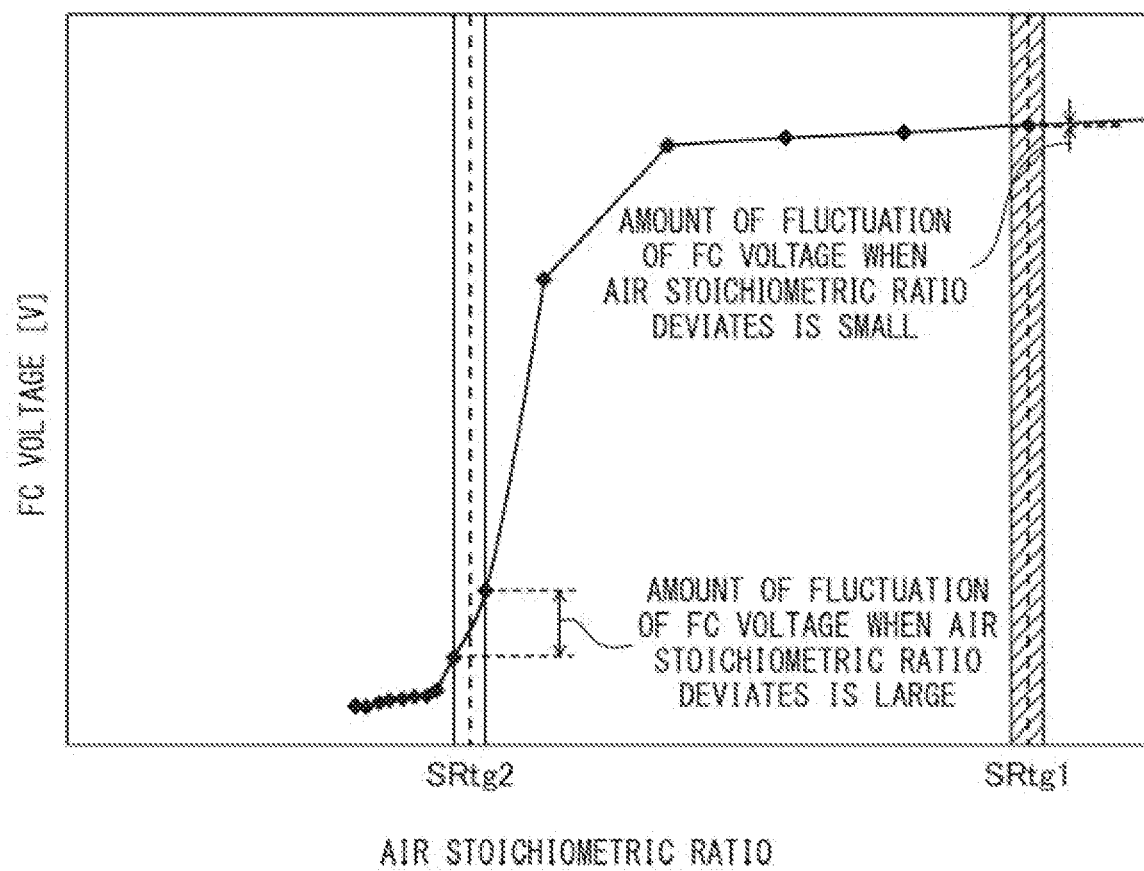
FIG. 4 is a view showing changes in an FC voltage when making an air stoichiometric ratio change in a state maintaining an FC current constant.

Here, as a result of intensive research by the inventors, it was learned that during this rapid warmup operation, a difference tends to easily arise between the target generated electric power Ptg and the actual generated electric power Pfc and, as a result, the battery charged and discharged electric powers are liable to become larger and cause deterioration of the battery. Below, this problem point will be explained while referring to FIG. 4 in addition to FIG. 3. Note that. FIG. 4 is a view showing changes in the FC voltage Vfc when making the air stoichiometric ratio change (that is, when making the FC air feed quantity Qfc change) while maintaining the FC current Ifc constant.

As shown in FIG. 3, if comparing the amount of change of the oxygen concentration overvoltage when the air stoichiometric ratio changes by exactly a predetermined amount, it tends to become larger when the air stoichiometric ratio is small compared to when it is large. In other words, compared to when the air stoichiometric ratio is large, when it is small, the amount of drop of voltage and in turn the FC voltage Vfc tends to become easier to fluctuate when the air stoichiometric ratio changes.

For this reason, as shown in FIG. 4, for example, at the time of normal operation where the FC air feed quantity Qfc is controlled so that the air stoichiometric ratio becomes a certain target air stoichiometric ratio SRtg1 in a normal region where the above-mentioned oxygen concentration overvoltage can be substantially ignored, even if the FC air feed quantity Qfc fluctuates and the air stoichiometric ratio deviates from the target air stoichiometric ratio SRtg1, the amount of fluctuation of the FC voltage Vfc is small.

As opposed to this, for example, at the time of a rapid warmup operation where the FC air feed quantity Qfc is controlled so that the air stoichiometric ratio becomes a certain target air stoichiometric ratio SRtg2 in the rapid warmup region where the above-mentioned oxygen concentration overvoltage can no longer be ignored, if the FC air feed quantity Qfc fluctuates and the air stoichiometric ratio deviates from the target air stoichiometric ratio SRtg2, the FC voltage Vfc greatly fluctuates even if the extent of deviation from the time of normal operation were the same.

In this way, when, during a rapid warmup operation, the air stoichiometric ratio deviates from the target air stoichiometric ratio, the amount of fluctuation of the FC voltage Vfc tends to become larger than the time of normal power generation.

Further, at a time of transition when the target generated electric power Ptg changes in steps, until the FC air feed quantity Qfc is controlled to the post-transition target air feed quantity Qtg, the air stoichiometric ratio will deviate from the post-transition target air stoichiometric ratio. For this reason, during a rapid warmup operation, in particular at a time of transition, the FC voltage Vfc tends to greatly deviate from the target FC voltage Vtg. As a result, the actual generated electric power Pfc tends to greatly deviate from the target generated electric power Ptg.

If the actual generated electric power Pfc becomes larger than the target generated electric power Ptg, the excess electric power at that time is charged to the battery 53. For this reason, if the excess electric power becomes greater, the charged electric power of the battery 53 is liable to become equal to or greater than the allowable charged electric power win [kW] set according to the battery state for keeping the battery 53 from deteriorating and the battery 53 to be made to deteriorate. In particular, when using a lithium ion battery as the battery 53, if the excess electric power becomes larger, so-called "lithium deposition" where lithium deposits on the negative electrode surface of the battery 53 is liable to occur.

Further, if the actual generated electric power Pfc becomes smaller than the target generated electric power Ptg, the insufficient amount of electric power at that time is output from the battery 53. For this reason, if the insufficient amount of electric power becomes greater, the discharged electric power of the battery 53 is liable to become equal to or greater than the allowable discharged electric power Wout [kW] set in accordance with the state of the battery to keep the battery 53 from deteriorating in the same way as the allowable charged electric power Win and the battery 53 to be made to deteriorate.

Note that, in the present embodiment, the charged electric power of the battery 53 is a positive value which becomes larger in value the larger the electric power charged to the battery 53. Further, the discharged electric power of the battery 53 similarly is a positive value which becomes larger in value the larger the electric power discharged from the battery 53.

Further, the allowable charged electric power Win and the allowable discharged electric power Wout change in accordance with the battery state. For example, they tend to become smaller when the temperature of the battery 53 is low compared to when it is high. For this reason, during a rapid warmup operation, which basically is performed in an environment below the freezing point, since the temperature of the battery 53 is also low, the allowable charged electric power Win and the allowable discharged electric power Wout also tend to become smaller than at the time of normal operation. Therefore, during a rapid warmup operation, if deviation occurs between the actual generated electric power Pfc and the target generated electric power Ptg, in particular the battery 53 easily becomes an overcharged state or overdischarged state and the battery 53 easily deteriorates.

Therefore, in the present embodiment, when there is a request for a rapid warmup operation, normal power generation (high efficiency power generation) and low efficiency power generation are made to be selectively performed based on the target generated electric power Ptg, Specifically, if there is a request for a rapid warmup operation and low efficiency power generation is performed, when the target generated electric power Ptg becomes equal to or greater than a predetermined first switching electric power Pthr1, the low efficiency power generation is temporarily stopped and normal power generation is performed.

Here, as explained before, during a rapid warmup operation, at the time of transition during which the target generated electric power Ptg fluctuates, the actual generated electric power Pfc tends to greatly deviate from the target generated electric power Ptg. In other words, at the time the vehicle is ruining where the accelerator pedal is operated, the actual generated electric power Pfc tends to greatly deviate from the target generated electric power Ptg.

Therefore, the first switching electric power Pthr1, for example, is made a generated electric power (for example, 30 kW) enabling judgment of the accelerator pedal being depressed and acceleration of the vehicle being started. Due to this, when the vehicle is running, during which the target generated electric power Ptg easily fluctuates, normal power generation can be performed, so the actual generated electric power Pfc can be kept from deviating from the target generated electric power Ptg and the battery 53 can be kept from becoming an overcharged state or overdischarged state.

Further, in the present embodiment, if temporarily stopping the low efficiency power generation to perform normal power generation, low efficiency power generation is made to be performed when the target generated electric power Ptg becomes less than a predetermined second switching electric power Pthr2 smaller than the first switching electric power Pthr1.

The second switching electric power Pthr2 is, for example, made a generated electric power (for example, 20 kW) enabling judgment of the state being one where the target generated electric power Ptg hardly fluctuates such as in the case where the accelerator pedal is not depressed and the vehicle is in a stopped state. Due to this, when the state is one where the target generated electric power Ptg hardly fluctuates, it is possible to switch from normal power generation to low efficiency power generation, so it is possible to promote warmup of the fuel cell stack 10.

Further, by making the threshold value for switching from the low efficiency power generation to normal power generation (first switching electric power Pthr1) and the threshold value for switching from normal power generation to low efficiency power generation (second switching electric power Pthr2) different, it is possible to keep down hunting where the power generation mode is repeatedly switched.

Below, referring to FIG. 5, control for switching power generation during a rapid warmup operation according to the present embodiment will be explained.

Figure 5:
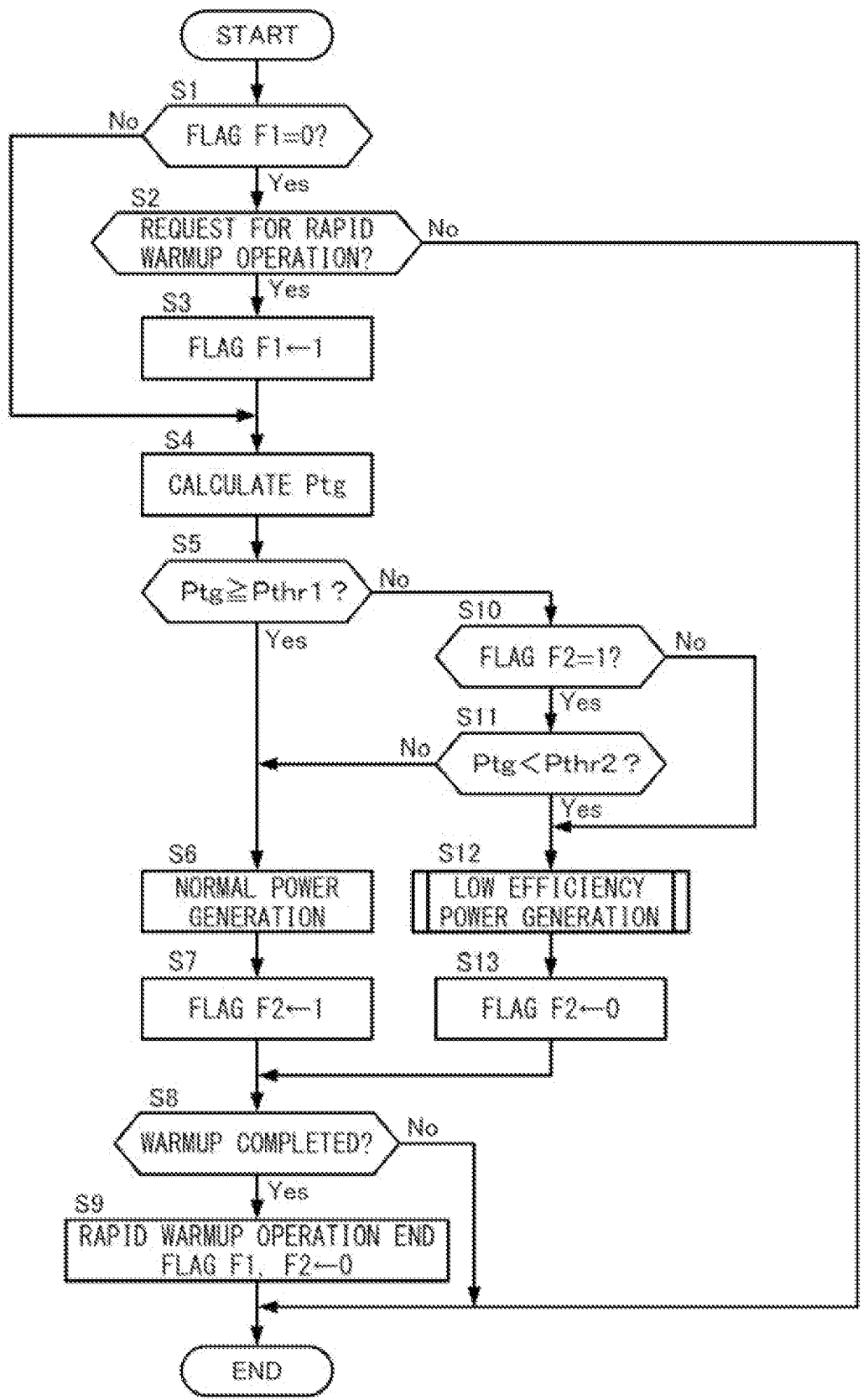
FIG. 5 is a flow chart explaining power generation switching control in a rapid warmup control according to one embodiment of the present disclosure.

FIG. 5 is a flow chart explaining control for switching power generation during a rapid warmup operation according to the present embodiment. The electronic control unit 200 repeatedly performs the present routine by a predetermined processing period (for example, 10 ms).

At step S1, the electronic control unit 200 judges if a rapid warmup flag F1 is set to 0. The rapid warmup flag F1 is a flag with an initial value set to 0 and a flag which is set to 1 when starting a rapid warmup operation and which is returned to 0 when ending a rapid warmup operation. The electronic control unit 200 proceeds to the processing of step S2 if the rapid warmup flag F1 is 0. On the other hand, the electronic control unit 200 proceeds to the processing of step S4 if the rapid warmup flag F1 is 1.

At step S2, the electronic control unit 200 judges if there is a request for a rapid warmup operation. In the present embodiment, the electronic control unit 200 judges that there is a request for a rapid warmup operation if the fuel cell system 100 is being started up and the FC temperature is equal to or less than a predetermined rapid warmup request temperature (for example, 0° C.). The electronic control unit 200 proceeds to the processing of step S3 when it is judged that there is a request for a rapid warmup operation. On the other hand, the electronic control unit 20 ends the current processing when judging that there is no request for a rapid warmup operation.

At step S3, the electronic control unit 200 sets the rapid warmup fag F1 to 1.

At step S4, the electronic control unit 200 calculates the target generated electric power Ptg of the fuel cell stack 10 based on the operating state of the fuel cell system 100. As explained above, the electronic control unit 200 calculates the total value of the requested electric power of the motor-generator 53 and the requested electric powers of the compressor 33 and other various auxiliaries as the target generated electric power Ptg.

At step S5, the electronic control unit 200 judges if the target generated electric power Ptg is equal to or greater than the predetermined first switching electric power Pthr1. The electronic control unit 200 proceeds to the processing of step S6 to temporarily stop the low efficiency power generation and perform normal power generation if the target generated electric power Ptg is equal to or greater than the first switching electric power Pthr1. On the other hand, the electronic control unit 200 proceeds to the processing of step S10 if the target generated electric power Ptg is less than the first switching electric power Pthr1.

At step S6, the electronic control unit 200) performs normal power generation. Specifically, the electronic control unit 200 controls the various control parts so that the operating point X defined by the FC current Ifc and FC voltage Vfc becomes the normal operating point X1 enabling generation of the target generated electric power Ptg on the standard IV characteristic.

At step S7, the electronic control unit 200 sets a normal power generation flag F2 to 1. The normal power generation flag F2 is a flag which is set to 1 when performing normal power generation if there is a request for a rapid warmup operation. Its initial value is set to 0.

At step S8, the electronic control unit 200 judges if the fuel cell stack 10 has finished being warmed up. In the present embodiment, the electronic control unit 200 judges if the FC temperature Tfc has become equal to or greater than a predetermined rapid warmup completion temperature (for example, 70° C.). The electronic control unit 200 proceeds to the processing of step S9 if the FC temperature Tfc is equal to or greater than a rapid warmup completion temperature. On the other hand, the electronic control unit 200 ends the current processing if the FC temperature Tfc is less than the rapid warmup completion temperature.

At step S9, the electronic control unit 200 ends the rapid warmup operation and returns the rapid warmup flag F1 and normal power generation flag F2 to respectively 0.

At step S10, the electronic control unit 200 judges if the normal power generation flag F2 has been set to 1, that is, if normal power generation is being performed. The electronic control unit 200 proceeds to the processing of step S11 if normal power generation is being performed. On the other hand, the electronic control unit 200 proceeds to the processing of step S12 if normal power generation is not being performed.

At step S11, the electronic control unit 200 judges if the target generated electric power Ptg is less than the predetermined second switching electric power Pthr2. The electronic control unit 200 proceeds to the processing of step S12 to restart the low efficiency power generation if the target generated electric power Ptg is less than the second switching electric power Pthr2. On the other hand, the electronic control unit 200 proceeds to the processing of step S6 to continue the normal power generation if the target generated electric power Ptg is equal to or greater than the second switching electric power Pthr2.

At step S12, the electronic control unit 200 performs the low efficiency power generation. The detailed processing at the time of the low efficiency power generation will be explained later referring to FIG. 6.

At step S13, the electronic control unit 200 returns the normal power generation lag F2 to 0.

Figure 6:
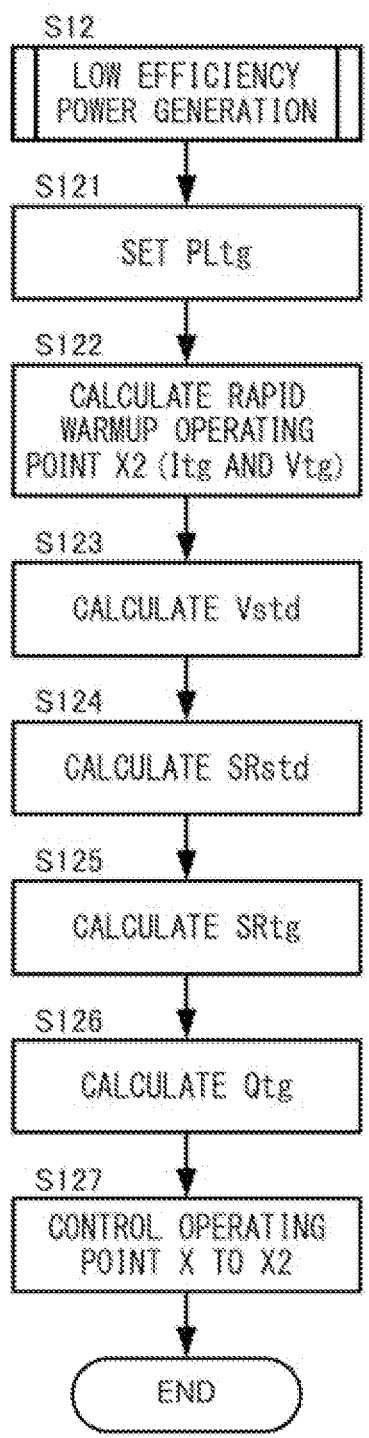
FIG. 6 is a flow chart explaining detailed processing at a time of low efficiency power generation.

FIG. 6 is a flow chart explaining the detailed processing at the time of the low efficiency power generation.

At step S121, the electronic control unit 200 sets the target heat generation PUS during the low efficiency power generation. The target heat generation PLtg is made a predetermined fixed value in the present embodiment, but may also be made a variable value.

Figure 7:
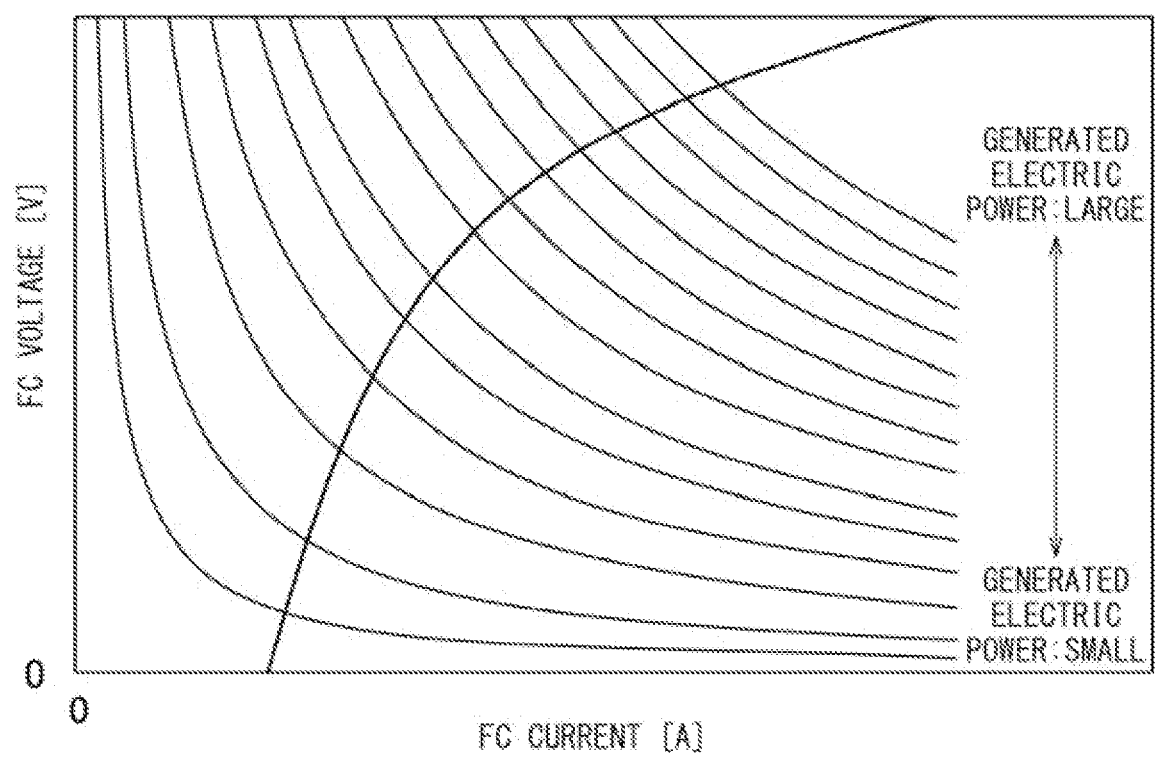
FIG. 7 is an IV characteristic map in which lines of equal power and a line of equal heat generation are drawn for calculating a rapid warmup operating point X2.

At step S122, the electronic control unit 20 refers to the IV characteristic map shown in FIG. 7 in which lines of equal power (see fine solid lines) and a line of equal heat generation (see thick solid line) are drawn and calculates the rapid warmup operating point X2, that is, target FC current Itg [A] and target PC voltage Vtg [V], based on the target generated electric power Ptg and the target amount of heat generation PLtg.

Figure 8:
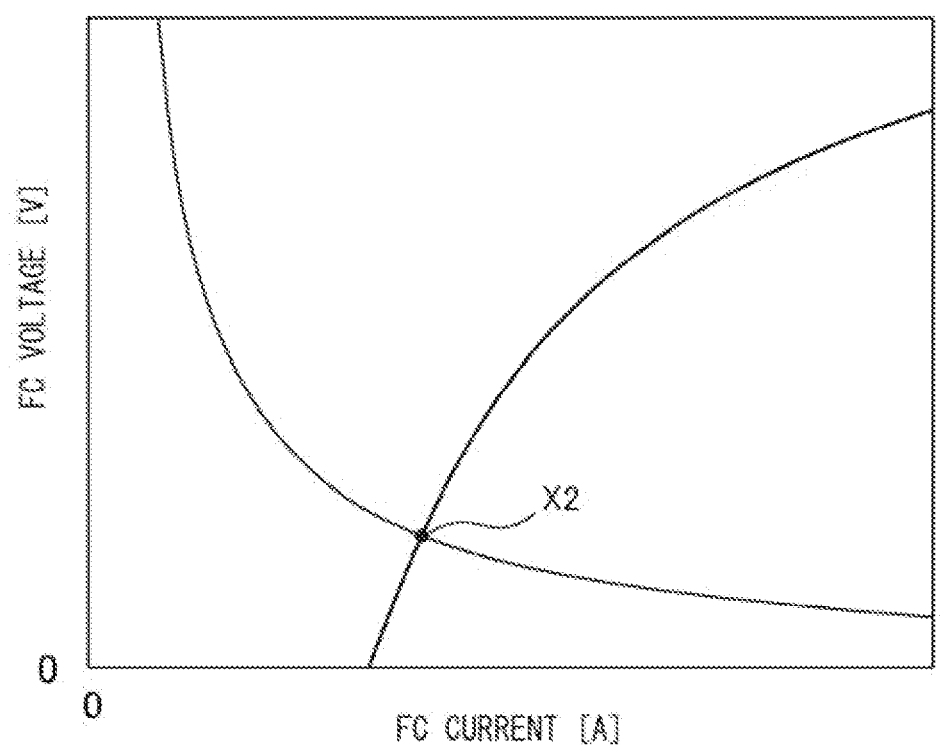
FIG. 8 is a view explaining a method of calculation of the rapid warmup operating point X2.

Specifically, the electronic control unit 200, as shown in FIG. 8, selects the line of equal power enabling generation of the target generated electric power Ptg from among the lines of equal power and calculates the point at which the selected line of equal power and line of equal heat generation enabling the amount of heat generation to be made the target amount of heat generation PUS on the IV characteristic map intersect as the rapid warmup operating point X2.

Figure 9:
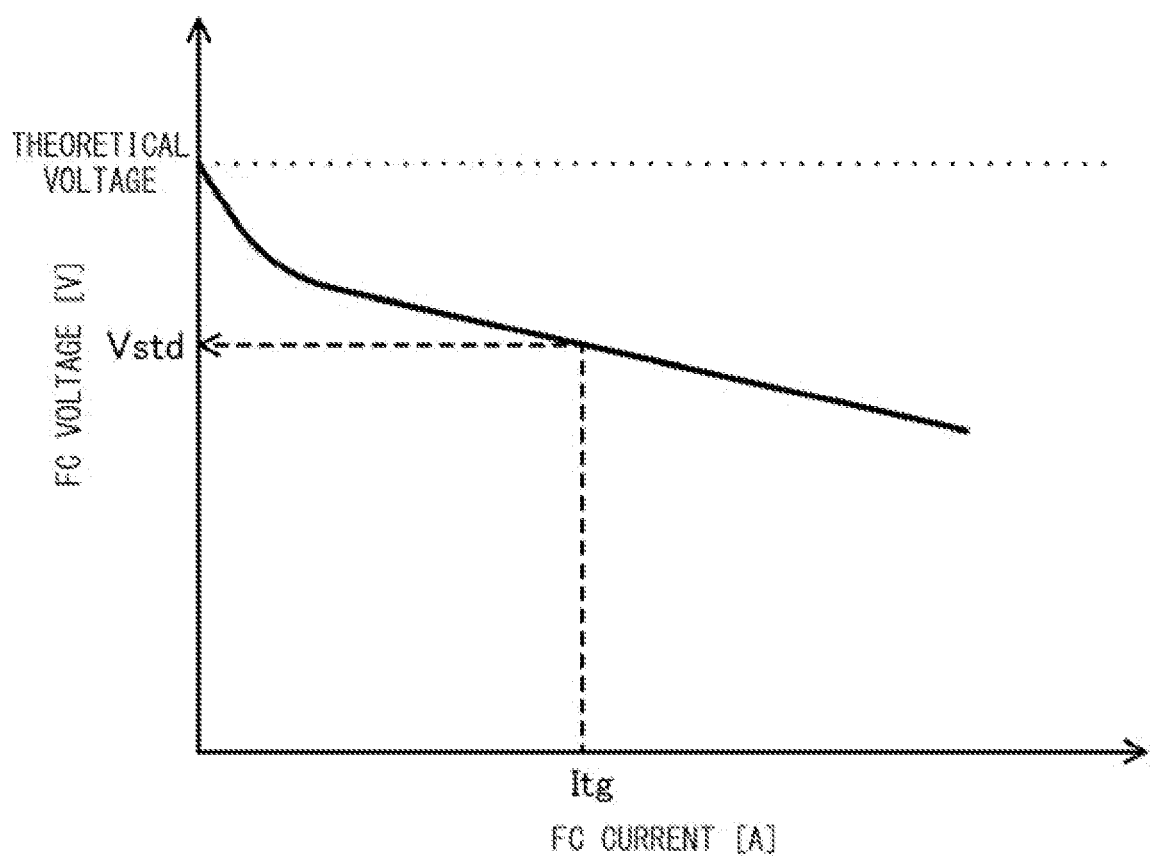
FIG. 9 is a standard IV characteristic map for calculating a standard FC voltage.

At step S123, the electronic control unit 200 refers to the standard IV characteristic map shown in FIG. 9 to calculate the FC voltage (hereinafter referred to as the "standard FC voltage") Vstd when controlling the FC current Ifc to the target PC current fig on the standard IV characteristic. The standard FC voltage Vstd, in other words, is the FC voltage when performing high efficiency power generation (normal power generation) to control the FC current Ifc to the target FC current Itg.

Note that the standard IV characteristic changes in accordance with the FC temperature Tfc, so a plurality of standard IV characteristic maps are prepared for each FC temperature. Therefore, the electronic control unit 20 refers to the optimal standard IV characteristic map corresponding to the current FC temperature Tfc from among the plurality of standard IV characteristic maps to calculate the standard FC voltage Vstd.

Figure 10:
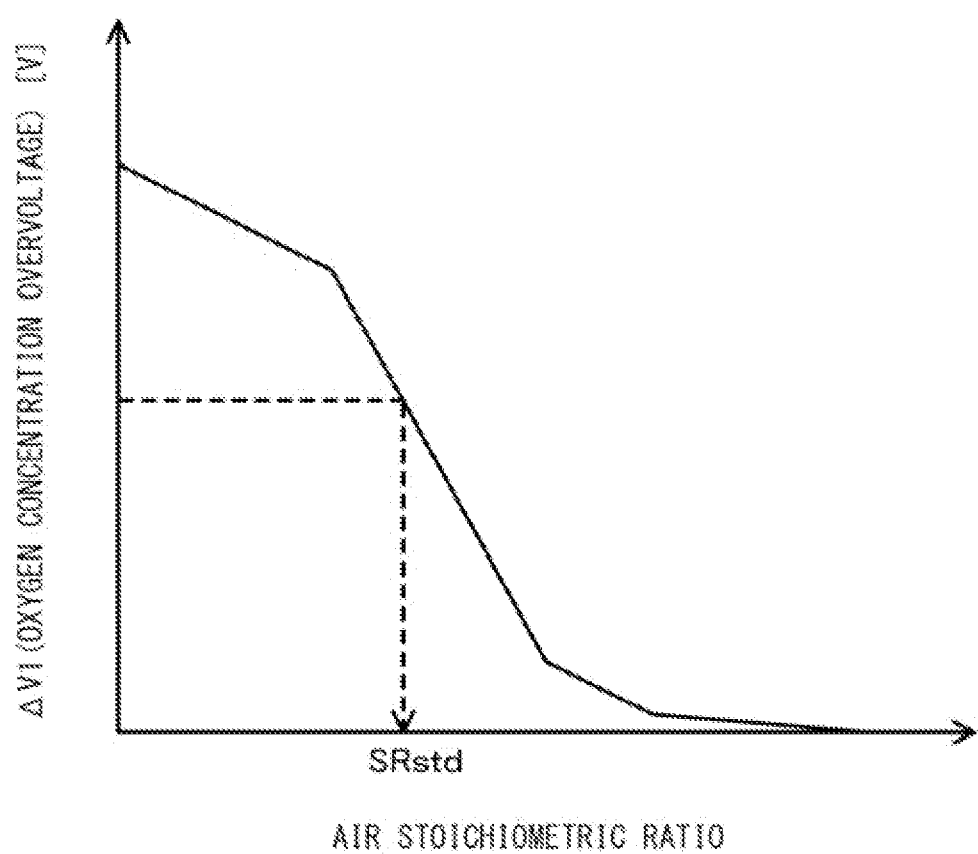
FIG. 10 is a map showing a relationship between the air stoichiometric ratio and the oxygen concentration overvoltage for calculating a standard air stoichiometric ratio.

At step S124, the electronic control unit 200 refers to a map showing the relationship between the air stoichiometric ratio and oxygen concentration overvoltage and shown in FIG. 10 similar to FIG. 3 and calculates the standard air stoichiometric ratio SRstd based on the difference ΔV1 (=Vstd−Vtg) between the standard FC voltage Vstd and the target FC voltage Vtg (that is, the oxygen concentration overvoltage required for generating the standard FC voltage Vstd so as to make it fall to the target FC voltage Vtg).

At step S125, the electronic control unit 200 calculates the feedback correction value for the standard air stoichiometric ratio SRstd based on the deviation ΔV2 (=Vtg−Vfc) between the target FC voltage Vtg and FC voltage Vfc (hereinafter referred to as the "FC voltage deviation") and adds that feedback correction value to the standard air stoichiometric ratio SRstd to calculate the target air stoichiometric ratio SRtg.

At step S126, the electronic control unit 200 multiplies the target air stoichiometric ratio SRtg with the theoretical FC air feed quantity Qth required for generating the target generated electric power Ptg to thereby calculate the target FC air feed quantity Qtg.

At step S127, the electronic control unit 200 controls the control parts so that the operating point X defined by the FC current Ifc and FC voltage Vfc becomes the rapid warmup operating point X2.

Specifically, the electronic control unit 200 controls the first converter 51 to control the PC current Ifc to the target FC current Itg and control the FC air feed quantity Qfc to the target air feed quantity Qtg. In the present embodiment, the electronic control unit 200 controls the compressor 33 so that the total air feed quantity Qafc becomes constant and controls the opening degree of the cathode inlet valve 35, distribution valve 37, and cathode pressure control valve 39 to thereby control the FC air feed quantity Qfc to the target air feed quantity Qtg.

In this regard, if like in the present embodiment enabling selective performance of normal power generation and the low efficiency power generation during a rapid warmup operation, when switching from normal power generation to the low efficiency power generation, that is, when changing the operating point X from the normal operating point X1 to the rapid warmup operating point X2, sometimes the battery 53 becomes an overcharged state and the battery 53 deteriorates. Below, this problem point and the measures against it will be briefly explained referring to FIG. 11.

Figure 11:
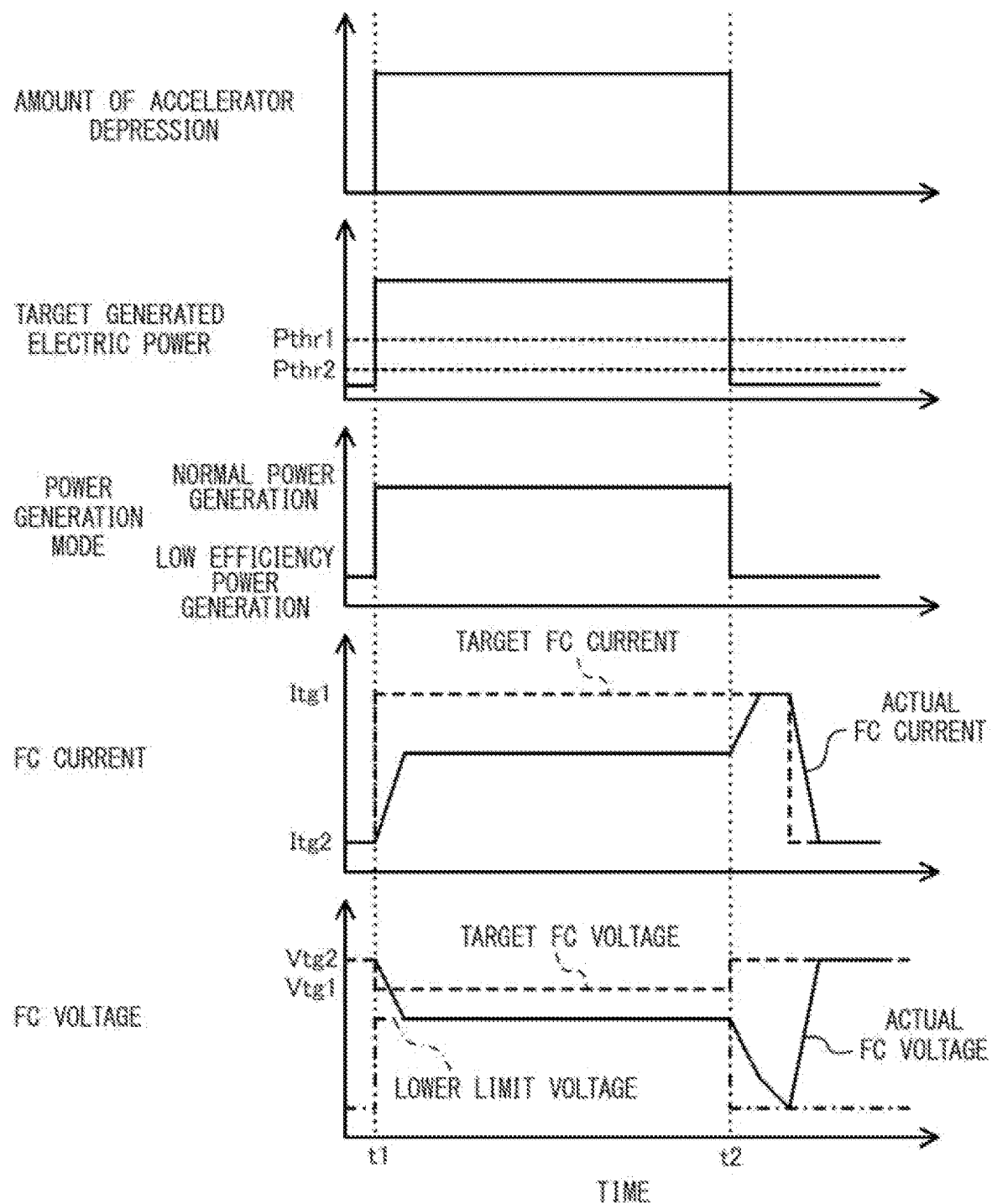
FIG. 11 is a view explaining problem points which can arise when switching from normal power generation to low efficiency power generation during a rapid warmup operation and measures against the same.

As shown in FIG. 11, for example, assume that at the time it the accelerator pedal is depressed and the target generated electric power Ptg becomes equal to or greater than the first switching electric power Pthr1 and the low efficiency power generation is switched to normal power generation. At the time of normal power generation during this rapid warmup operation, if the IV characteristic deteriorates due to some reason or another, when making the FC current Ifc increase to the target FC current Itg1 on the normal operating point X1, sometimes the FC voltage Vfc ends up falling to the lower limit voltage (guaranteed operating voltage of motorgenerator 55) and the FC current Ifc cannot be made to increase to the target FC current Itg1. If the FC current Ifc cannot be made to increase to the target FC current Itg1, the amount of consumption of oxygen is decreased, so the FC air feed quantity Qfc becomes excessive (air stoichiometric ratio is excessive).

Further if at the time 2 the accelerator pedal is returned, the target generated electric power Ptg falls, and the target generated electric power Ptg becomes less than the second switching electric power Pthr2, the normal power generation is switched to the low efficiency power generation and the target FC current Itg2 and the target PC air feed quantity Qtg2 enabling power generation on the rapid warmup operating point X2 are calculated. The target FC air feed quantity Qtg2 at the time of the low efficiency power generation naturally becomes smaller than the target FC air feed quantity Qtg1 at the time of normal power generation.

Further, as explained above, at the time t2 at the time of normal power generation before being switched to the low efficiency power generation, the FC current Ifc cannot be made to increase to the target FC current Itg1 and the PC air feed quantity Qfc becomes excessive. The speed of response of control of the FC air feed quantity Qfc is slower than the speed of response of control of the FC current Ifc, so if ending up making the FC current Ife fall to the target FC current Itg2 without thinking at all at the same time as switching from normal power generation to the low efficiency power generation, the FC air feed quantity Qfc becomes more excessive in state.

As a result, when controlling the FC current Ifc to the target FC current Itg2, while making the FC air feed quantity Qfc fall to the target FC air feed quantity Qtg2, the FC voltage Vfc becomes higher than the target FC voltage Ffc on the rapid warmup operating point X2, so the battery 53 is liable to become an overcharged state.

Therefore, in the present embodiment, as shown in FIG. 11, when at the time t2 the accelerator pedal is returned and normal power generation is switched to the low efficiency power generation, the lower limit voltage is made to temporarily fall to make the FC current Ifc increase, for example, to the target FC current Itg1 at the time of normal power generation. Due to this, it is possible to make the amount of consumption of oxygen increase while making the FC air feed quantity Qfc fall toward the target FC air feed quantity Qtg2, so it is possible to keep the FC air feed quantity Qfc from becoming an excessive state. In other words, it is possible to make the air stoichiometric ratio quickly converge toward the air stoichiometric ratio in the rapid warmup region.

Further, if a voltage drop occurs due to making the FC current Ifc increase, then a voltage drop further occurs due to the oxygen concentration overvoltage due to the drop in the air stoichiometric ratio and, for example, the FC voltage Vfc falls to the lower limit voltage where it temporarily is made to fall, the FC current I& is made to fall toward the target FC current Itg2.

In this way, by making the operating point X change from the normal operating point X1 to the rapid warmup operating point X2, it is possible to keep the FC voltage Vfc from becoming higher than the target FC voltage Ffc on the rapid warmup operating point X2 during the transition of the operating point X. Therefore, it is possible to keep the battery 53 from becoming an overcharged state and the battery 53 from deteriorating.

The fuel cell system 100 according to the present embodiment explained above is provided with a fuel cell stack 10 (fuel cell) generating electric power by electrochemical reactions between hydrogen as the fuel gas and air as the oxidizing agent gas, a battery 53 (rechargeable battery) charged with excess electric power and discharging the insufficient amount of electric power at the time of power generation of the fuel cell stack 10, and an electronic control unit 200 (control device). The electronic control unit 2100 is provided with a power generation part configured to enable selection of normal power generation and low efficiency power generation with a larger power generation loss compared with normal power generation when there is a request for warmup of the fuel cell stack 10.

Further, it is configured to temporarily stop low efficiency power generation to perform normal power generation when, during performance of low efficiency power generation, the target generated electric power Ptg of the fuel cell stack 10 becomes equal to or greater than the predetermined first switching electric power Pthr1.

Due to this, at the time of transition where the target generated electric power Ptg increases, it is possible to perform normal power generation, so it is possible to keep the actual generated electric power Pfc from deviating from the target generated electric power Ptg and keep the battery 53 from becoming an overcharged state or overdischarged state. Further, regardless of whether being the time of the normal power generation or the time of low efficiency power generation, as the actual generated electric power Pfc increases, basically the power generation loss increases and the amount of self heat generation increases, so even if performing normal power generation, it is possible to secure a certain extent of amount of heat generation and promote warmup.

Further, it is configured to perform low efficiency power generation when the target generated electric power Ptg has become less than the predetermined second switching electric power Pthr2 smaller than the first switching electric power Pthr1 if the power generation part according to the present embodiment temporarily stops the low efficiency power generation and performs normal power generation.

In this way, by making the threshold value for switching from the low efficiency power generation to normal power generation (first switching electric power Pthr1) and the threshold value for switching from normal power generation to the low efficiency power generation (second switching electric power Pthr2) different, it is possible to keep down hunting where the power generation mode is repeatedly switched.

Further, the fuel cell system 100 according to the present embodiment is further provided with a motor-generator 55 (rotary electrical machine) driven by generated electric power of the fuel cell stack 10. The first switching electric power Pthr1 is made an electric power (for example, 30 kW) enabling judgment of the motor-generator 55 being in a driven state while the second switching electric power Pthr2 is made an electric power (for example, 20 kW) enabling judgment of the motor-generator 55 being in a nondriven state.

During a rapid warmup operation, at the time of transition where the target generated electric power Ptg fluctuates, the actual generated electric power Pfc tends to greatly deviate from the target generated electric power Ptg. In other words, during running of the vehicle where the accelerator pedal is operated, the actual generated electric power Pfc tends to greatly deviate from the target generated electric power Ptg.

For that reason, by setting the first switching electric power Pthr1 to electric power enabling judgment of the motor-generator 55 being in a driven state, it is possible to perform normal power generation during running of the vehicle where the target generated electric power Ptg easily fluctuates. Therefore, it is possible to keep the actual generated electric power Pfc from deviating from the target generated electric power Ptg and keep the battery 53 from becoming an overcharged state or overdischarged state.

Further, by setting the second switching electric power Pthr2 to an electric power enabling judgment of the motor-generator 55 being in a nondriven state, it is possible to switch from normal power generation to the low efficiency power generation when in a state where the target generated electric power Ptg easily fluctuates, so it is possible to promote warmup of the fuel cell stack 10.

Above, an embodiment of the present disclosure was explained, but the above embodiment merely shows part of the examples of application of the present disclosure and is not meant to limit the technical scope of the present disclosure to the specific constitution of the above embodiment.

For example, in the above embodiment, the explanation was given with reference to the example of the case mounting the fuel cell system 100 in a vehicle, but the disclosure is not limited to a vehicle and can be mounted in various mobile members. It may be mounted in a stationary type power generation facility as well.

The invention claimed is:

1. A fuel cell system comprising:
   a fuel cell configured to generate electric power by electrochemical reactions between a fuel gas and oxidizing agent gas;
   a rechargeable battery configured to charge excess electric power when an actual generated electric power of the fuel cell becomes greater than a target generated electric power of the fuel cell, and discharge an insufficient amount of electric power when the actual generated electric power become smaller than the target generated electric power; and a control device, wherein the control device comprises a power generation part configured to be able to selectively perform normal power generation and low efficiency power generation in which the power generation loss is greater compared with normal power generation when there is a request for warmup of the fuel cell, and the power generation part is configured to temporarily stop low efficiency power generation and perform normal power generation when during performance of low efficiency power generation the target generated electric power of the fuel cell becomes equal to or greater than a predetermined first switching electric power.

2. The fuel cell system according to claim 1, wherein the power generation part is configured to perform low efficiency power generation when the target generated electric power of the fuel cell has become less than a predetermined second switching electric power smaller than the first switching electric power if temporarily stopping the low efficiency power generation and performing normal power generation.

3. The fuel cell system according to claim 1, further comprising a rotary electrical machine driven by the generated electric power of the fuel cell, wherein the first switching electric power is electric power enabling judgment of the rotary electric machine being in a driven state.

4. The fuel cell system according to claim 1, wherein the first switching electric power is 30 kW.

5. The fuel cell system according to claim 2, further comprising a rotary electrical machine driven by the generated electric power of the fuel cell, wherein the first switching electric power is electric power enabling judgment of the rotary electrical machine being in a driven state, and the second switching electric power is electric power enabling judgment of the rotary electrical machine being in a nondriven state.

6. The fuel cell system according to claim 5, where the first switching electric power is 30 kW and the second switching electric power is 20 kW.

7. A control method for a fuel cell system, wherein the fuel cell system comprises:

a fuel cell configured to generate electric power by electrochemical reactions between a fuel gas and oxidizing agent gas; and a rechargeable battery configured to charge excess electric power when an actual generated electric power of the fuel cell becomes greater than a target generated electric power of the fuel cell, and discharge an insufficient amount of electric power when the actual generated electric power becomes smaller than the target generated electric power, and wherein the control method comprise:

selectively performing normal power generation and low efficiency power generation in which the power generation loss is greater compared with normal power generation when there is a request for warmup of the fuel cell, and temporarily stopping low efficiency power generation and performing normal power generation when during performance of low efficiency power generation the target generated electric power of the fuel cell becomes equal to or greater than a predetermined first switching electric power.

* * * * *